(12) United States Patent
Miwa

(10) Patent No.: US 11,734,344 B2
(45) Date of Patent: Aug. 22, 2023

(54) ACOUSTIC PARAMETER EDITING METHOD, ACOUSTIC PARAMETER EDITING SYSTEM, MANAGEMENT APPARATUS, AND TERMINAL FOR SELECTIVELY SHARING A PREVIEW MEMORY

(71) Applicant: Yamaha Corporation, Hamamatsu (JP)

(72) Inventor: Akihiro Miwa, Kosai (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/455,030

(22) Filed: Nov. 16, 2021

(65) Prior Publication Data
US 2022/0171805 A1 Jun. 2, 2022

(30) Foreign Application Priority Data
Nov. 27, 2020 (JP) .................. 2020-196524

(51) Int. Cl.
G06F 16/68 (2019.01)
G06F 16/635 (2019.01)
G06F 16/638 (2019.01)
G06F 16/64 (2019.01)
G06F 3/16 (2006.01)

(52) U.S. Cl.
CPC .......... G06F 16/686 (2019.01); G06F 16/635 (2019.01); G06F 16/638 (2019.01); G06F 16/64 (2019.01); G06F 3/16 (2013.01); G06F 3/165 (2013.01)

(58) Field of Classification Search
CPC . G06F 3/16; G06F 3/165; G06F 3/686; G06F 3/638; G06F 3/64; G06F 3/635
See application file for complete search history.

(56) References Cited

U.S. PATENT DOCUMENTS

2002/0156547 A1  10/2002  Suyama et al.
2003/0028598 A1*  2/2003  Moller ................. G10H 1/0058
                                                       709/205
2006/0123347 A1*  6/2006  Hewitt ..................... G06F 9/451
                                                       709/206

(Continued)

FOREIGN PATENT DOCUMENTS

JP    2002-319914 A    10/2002

Primary Examiner — Daniel Samwel
(74) Attorney, Agent, or Firm — Crowell & Moring LLP

(57) ABSTRACT

An acoustic parameter editing method is used in a plurality of terminals configured to receive editing of an acoustic parameter and a management apparatus individually connected to the plurality of terminals and including a preview memory configured to preview the acoustic parameter before reflecting the acoustic parameter in a sound signal processing engine. When a first terminal among the plurality of terminals is connected to the management apparatus and a request for the preview is made from the first terminal, the management apparatus causes the first terminal to refer to the preview memory in response to the request from the first terminal. Thereafter, when a second terminal among the plurality of terminals is connected to the management apparatus and a request for the preview is made from the second terminal, the management apparatus causes the second terminal to share the preview memory referenced by the first terminal.

15 Claims, 11 Drawing Sheets

(56) References Cited

U.S. PATENT DOCUMENTS

| | | | |
|---|---|---|---|
| 2009/0106429 A1* | 4/2009 | Siegal | G11B 27/034 709/227 |
| 2010/0064219 A1* | 3/2010 | Gabrisko | G06F 16/4393 700/94 |
| 2020/0410026 A1* | 12/2020 | Reuter | G06F 16/9577 |

* cited by examiner

ACOUSTIC PARAMETER EDITING METHOD, ACOUSTIC PARAMETER EDITING SYSTEM, MANAGEMENT APPARATUS, AND TERMINAL FOR SELECTIVELY SHARING A PREVIEW MEMORY

CROSS-REFERENCE TO RELATED APPLICATIONS

This application is based on and claims priority under 35 USC 119 from Japanese Patent Application No. 2020-196524 filed on Nov. 27, 2020, the contents of which are incorporated herein by reference.

TECHNICAL FIELD

An embodiment of the present invention relates to an acoustic parameter editing method, an acoustic parameter editing system, a management apparatus, and terminals.

BACKGROUND ART

A mixer can store currently set acoustic parameters in a scene memory as scene data. A user can reproduce acoustic parameters set in the past in the mixer by recalling the scene data. Accordingly, for example, the user can immediately call an optimum value for each scene set during a rehearsal of a concert. Such a reproduction operation is referred to as "scene recall".

Patent Literature 1 discloses a digital mixer that can preview contents of acoustic parameters before recalling a scene memory and reflecting the acoustic parameters in the mixer.

CITATION LIST

Patent Literature

Patent Literature 1: JP-2002-319914-A

The digital mixer of Patent Literature 1 can perform a preview for only one user who directly operates a panel.

SUMMARY OF INVENTION

Therefore, an object of an embodiment of the present invention is to provide an acoustic parameter editing method, an acoustic parameter editing system, a management apparatus, and terminals that can preview acoustic parameters even by a plurality of users who do not directly operate an acoustic apparatus such as a mixer.

According to one embodiment of the present invention, an acoustic parameter editing method is used in a plurality of terminals and a management apparatus. The plurality of terminals are configured to receive editing of an acoustic parameter, and the management apparatus is individually connected to the plurality of terminals and includes a preview memory configured to preview the acoustic parameter before reflecting the acoustic parameter in a sound signal processing engine. The acoustic parameter editing method includes: connecting a first terminal among the plurality of terminals to the management apparatus to make a request for the preview from the first terminal to the management apparatus; in response to the request from the first terminal, causing, by the management apparatus, the first terminal to refer to the preview memory of the management apparatus; subsequently connecting a second terminal among the plurality of terminals to the management apparatus to make a request for the preview from the second terminal to the management apparatus; and subsequently causing, by the management apparatus, the second terminal to share the preview memory referenced by the first terminal.

Further, according to another embodiment of the present invention, an acoustic parameter editing method is used in a plurality of terminals and a management apparatus. The plurality of terminals are configured to receive editing of an acoustic parameter, and the management apparatus is individually connected to the plurality of terminals and includes a plurality of preview memories configured to preview the acoustic parameter before reflecting the acoustic parameter in a sound signal processing engine. The acoustic parameter editing method includes: connecting a first terminal among the plurality of terminals to the management apparatus to make a request for the preview from the first terminal to the management apparatus; in response to the request from the first terminal, causing, by the management apparatus, the first terminal to refer to a first preview memory among the plurality of preview memories in the management apparatus; connecting a second terminal among the plurality of terminals to the management apparatus to make a request for the preview from the second terminal to the management apparatus; and subsequently in response to the request from the second terminal, causing, by the management apparatus, the second terminal to refer to a second preview memory among the plurality of preview memories in the management apparatus.

Furthermore, according to the other embodiment of the present invention, an acoustic parameter editing method is used in a plurality of terminals and a management apparatus. The plurality of terminals are configured to receive editing of an acoustic parameter, and the management apparatus is individually connected to the plurality of terminals and includes a plurality of preview memories configured to preview the acoustic parameter before reflecting the acoustic parameter in a sound signal processing engine. The acoustic parameter editing method includes: connecting a first terminal among the plurality of terminals to the management apparatus to make a request for the preview from the first terminal to the management apparatus; in response to the request from the first terminal, causing, by the management apparatus, the first terminal to refer to a first preview memory among the plurality of preview memories in the management apparatus; connecting a second terminal among the plurality of terminals to the management apparatus to make a request for the preview from the second terminal to the management apparatus; receiving, by the management apparatus, selection of whether to cause the second terminal to share the first preview memory referenced by the first terminal or to cause a second terminal to refer to a second preview memory among the plurality of preview memories in response to the request from the second terminal; and causing, by the management apparatus, the second terminal to refer to the selected first preview memory or the selected second preview memory.

According to embodiments of the present invention, a plurality of users who do not directly operate an acoustic apparatus such as a mixer can also preview acoustic parameters.

DESCRIPTION OF EMBODIMENTS

Figure 1:
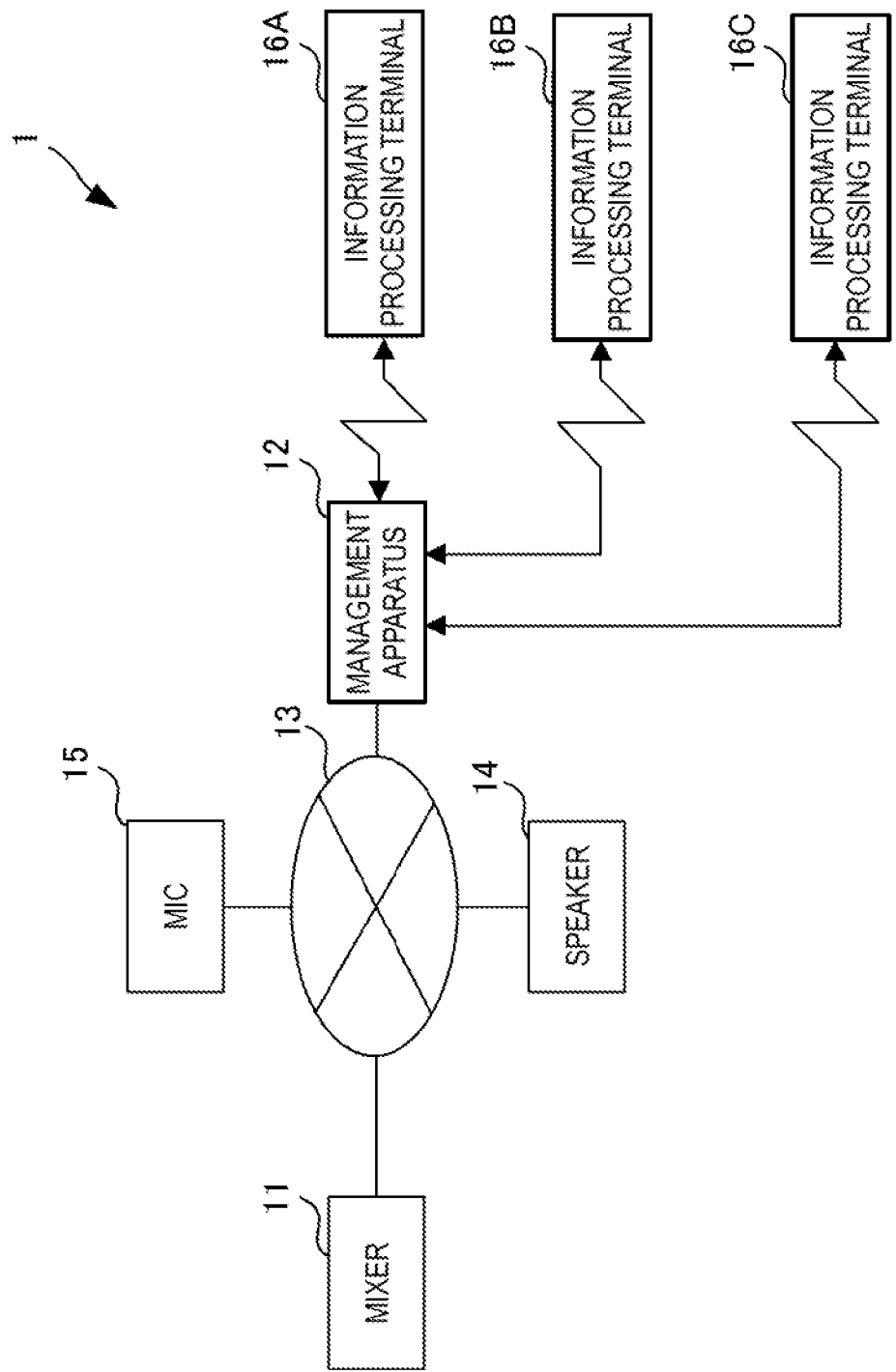
FIG. 1 is a block diagram showing a configuration of an acoustic parameter editing system 1.

FIG. 1 is a block diagram showing a configuration of an acoustic parameter editing system 1. The acoustic parameter editing system 1 includes a mixer 11, a management apparatus 12, a network 13, a speaker 14, a microphone 15, and a plurality of information processing terminals 16A to 16C.

The mixer 11, the speaker 14, the microphone 15, and the management apparatus 12 are connected via a network cable. The management apparatus 12 is connected to the information processing terminals 16A to 16C via wireless communication.

However, in the present invention, connection among the devices is not limited to this example. For example, the mixer 11, the speaker 14, and the microphone 15 may be connected by an audio cable. Further, the management apparatus 12 and the information processing terminals 16A to 16C may be connected via wired communication, or may be connected by a communication line such as a USB cable.

The mixer 11 receives a sound signal from the microphone 15. Further, the mixer 11 outputs the sound signal to the speaker 14. In the present embodiment, the speaker 14 and the microphone 15 are shown as examples of an acoustic device connected to the mixer 11, but in practice, a large number of acoustic devices are connected to the mixer 11. The mixer 11 receives sound signals from a plurality of acoustic devices such as the microphone 15, performs a signal processing such as mixing, and outputs the sound signals to the plurality of acoustic devices such as the speaker 14.

Figure 2:
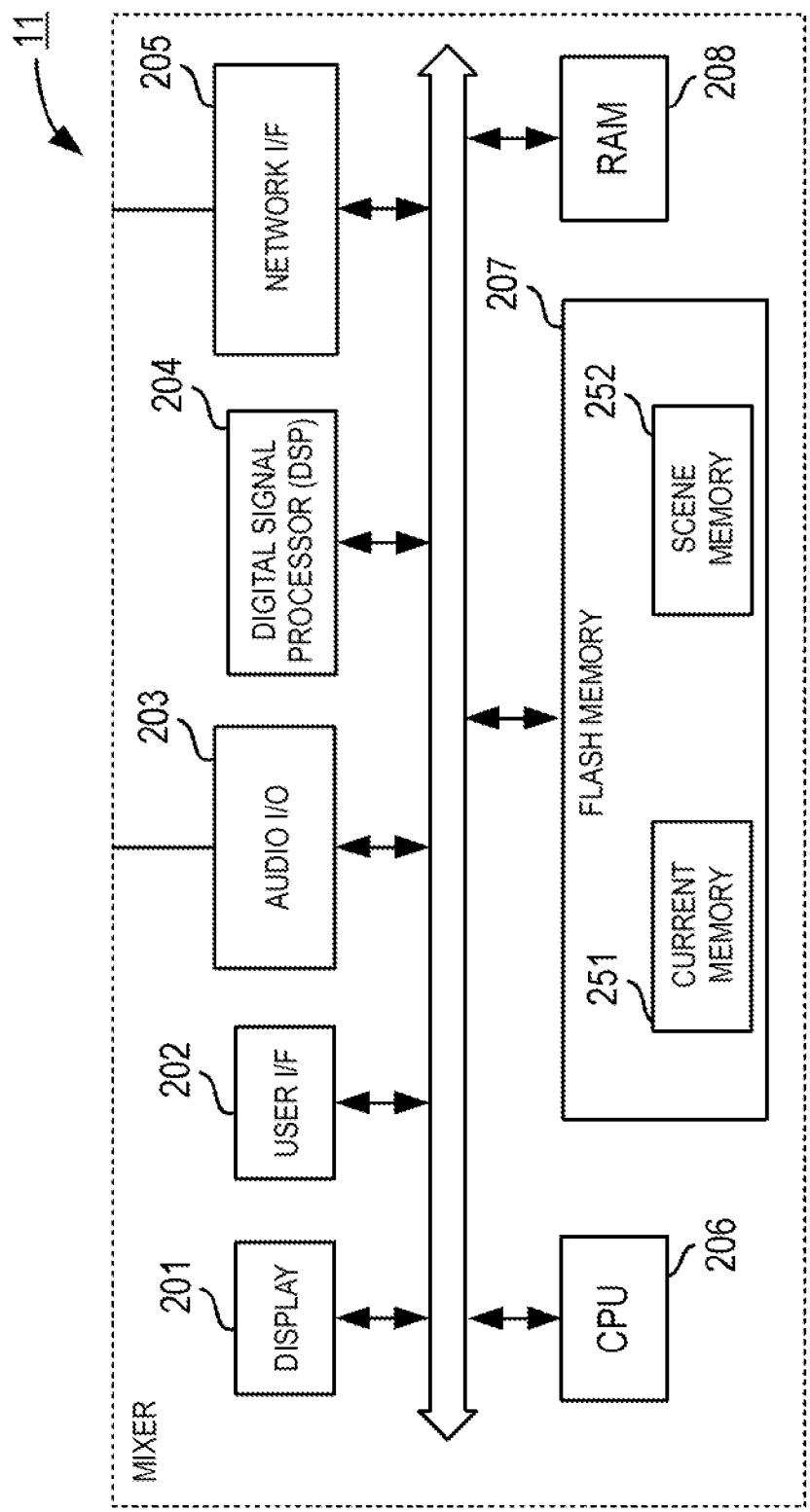
FIG. 2 is a block diagram showing a configuration of a mixer 11.

FIG. 2 is a block diagram showing a configuration of the mixer 11. The mixer 11 includes a display 201, a user I/F 202, an audio input/output (I/O) 203, a digital signal processor (DSP) 204, a network I/F 205, a CPU 206, a flash memory 207, and a RAM 208.

The CPU 206 is a control unit that controls an operation of the mixer 11. The CPU 206 performs various operations by reading a predetermined program stored in the flash memory 207, which is a storage medium, into the RAM 208 and executing the program.

The program read by the CPU 206 does not need to be stored in the flash memory 207 in the own apparatus. For example, the program may be stored in a storage medium of an external apparatus such as a server. In this case, the CPU 206 may read the program from the server into the RAM 208 and execute the program each time.

The digital signal processor 204 is configured with the DSP for performing signal processing. The digital signal processor 204 performs a signal processing such as a mixing processing and a filter processing on a sound signal input from an acoustic device such as the microphone 15 via the audio I/O 203 or the network I/F 205. The digital signal processor 204 outputs an audio signal after the signal processing to an acoustic device such as the speaker 14 via the audio I/O 203 or the network I/F 205.

Figure 3:
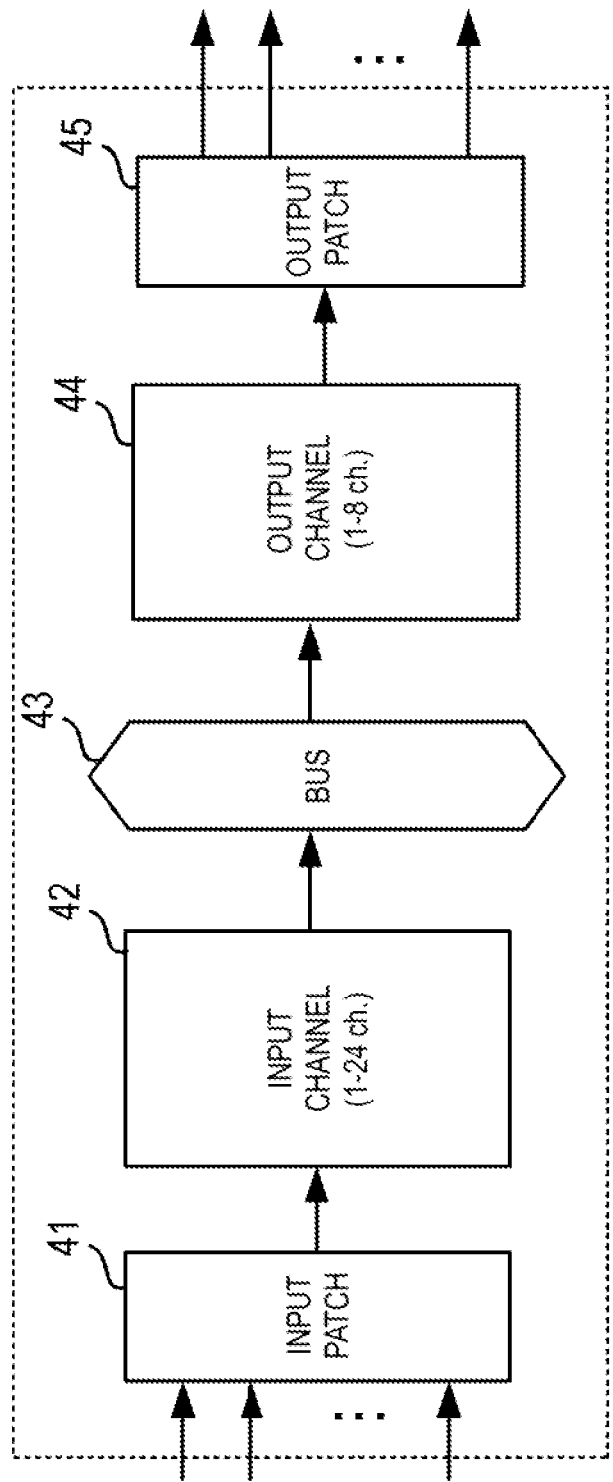
FIG. 3 is a functional block diagram of a signal processing implemented by a digital signal processor 204 and a CPU 206.

FIG. 3 is a functional block diagram of a signal processing implemented by the digital signal processor 204 and the CPU 206. As shown in FIG. 3, the signal processing is functionally performed by an input patch 41, an input channel 42, a bus 43, an output channel 14, and an output patch 45.

The input channel 42 has a signal processing function of a plurality of channels (for example, 24 channels). The input patch 41 assigns an acoustic device on an input side to any one of the channels of the input channel 42.

A sound sisal is supplied from the input patch 41 to each channel of the input channel 42. Each channel of the input channel 42 performs signal processing on the input sound signal. Further, each channel of the input channel 42 sends the sound signal after the signal processing to the bus 43 in a subsequent stage.

The bus 43 mixes the input sound signals and outputs the mixed sound signals. The bus 43 includes a plurality of buses such as STL (stereo L) buses, STR (stereo R) buses, AUX buses, or MLX buses.

The output channel performs a signal processing on sound signals output from the plurality of buses. The output patch 45 assigns channels of the output channel 44 to an acoustic device on an output side. The output patch 45 outputs a sound signal via the audio I/O 203 or the network I/F 205.

A user sets the input patch 41, the input channel 42, the bus 43, the output channel 44, and the output patch 45 via the user I/F 202. The user sets, for example, a destination and a feed amount of a sound signal of each channel of the input channel 42. Acoustic parameters indicating settings of the input patch 41, the input channel 42, the bus 43, the output channel 44, and the output patch 45 are stored in a current memory 251. The digital signal processor 204 and the CPU 206 cause the input patch 41, the input channel 42, the bus 43, the output channel 44, and the output patch 45 to operate based on contents of the current memory 251. In this way, the mixer 11 functions as an example of a signal processing engine that performs a signal processing by reflecting the acoustic parameters of the current memory 251.

When the user operates the user I/F 202 to instruct to store a scene, the CPU 206 stores the contents of the current memory 251 in a scene memory 252 as one piece of scene data. The number of scene data stored in the scene memory 252 is not limited to one. The scene memory 252 may store a plurality of pieces of scene data. The user can call (recall)

setting values of various acoustic parameters by calling optional scene data from the plurality of pieces of scene data.

Figure 4:
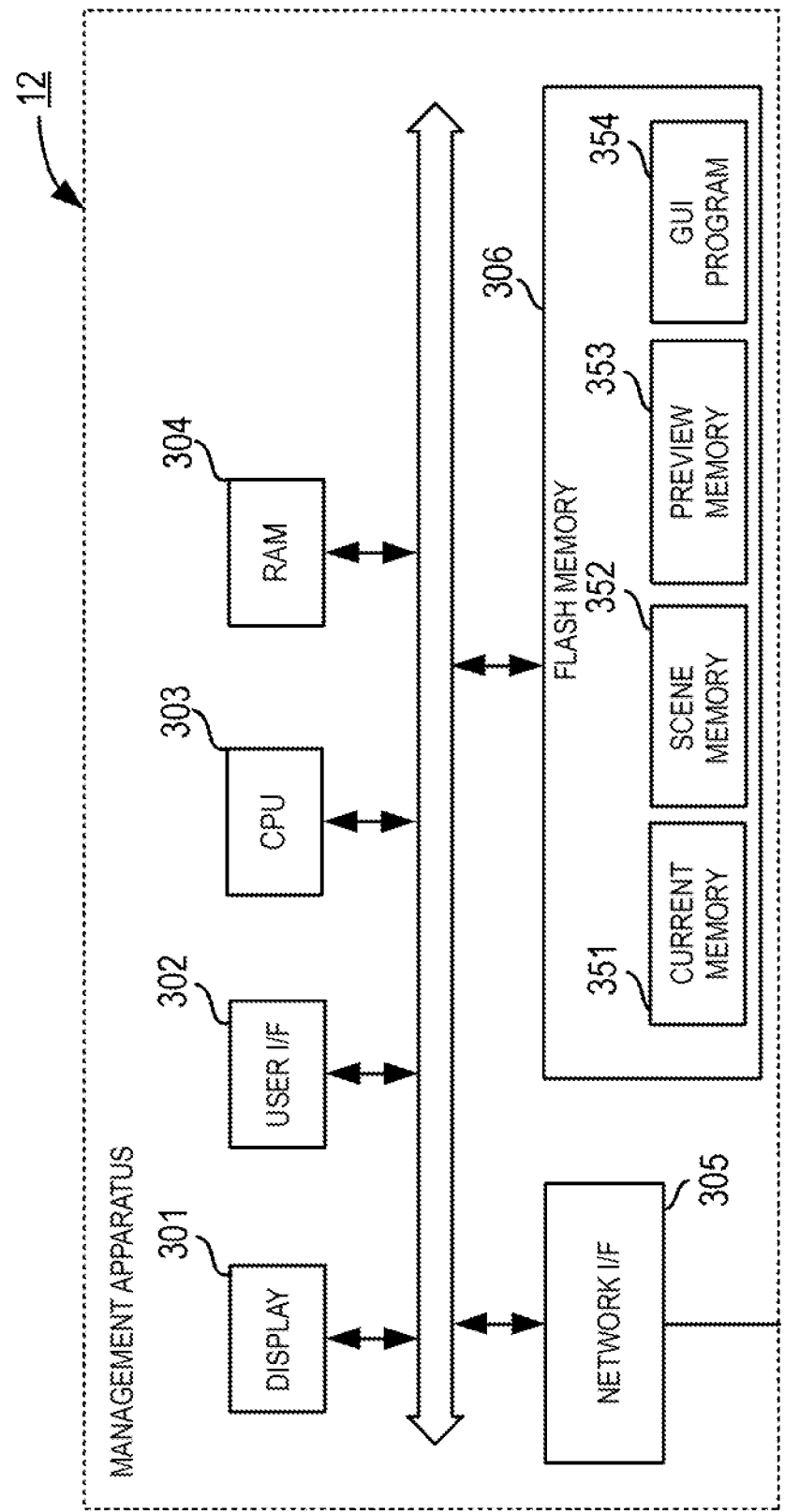
FIG. 4 is a block diagram showing a configuration of a management apparatus 12.

Next, FIG. 4 is a block diagram showing a configuration of the management apparatus 12. The management apparatus 12 is, for example, an information processing apparatus such as a personal computer or a dedicated embedded system.

The management apparatus 12 includes a display 301, a user I/F 302, a CPU 303, a RAM 304, a network I/F 305, and a flash memory 306.

The CPU 303 reads a program stored in the flash memory 306, which is a storage medium, into the RAM 304 to implement a predetermined function. The program read by the CPU 303 also does not need to be stored in the flash memory 306 in the own apparatus. For example, the program may be stored in a storage medium of an external apparatus such as a server. In this case, the CPU 303 may read the program from the server into the RAM 304 and execute the program each time.

The flash memory 306 includes a current memory 351, a scene memory 352, a preview memory 353, and a GUI program 354.

The GUI program 354 may be a native application program that operates on an operating system of the management apparatus 12, but may be, for example, a web application program. When the GUI program 354 is the web application program, the user receives a GUI from the GUI program 354 via an application program of a web browser. Accordingly, the user can edit the current memory 351, the scene memory 352, and the preview memory 353 via the GUI program 354.

The current memory 351 and the scene memory 352 are synchronized with the current memory 251 and the scene memory 252 of the mixer 11. For example, when the user operates the user I/F 202 of the mixer 11 to change the acoustic parameters, the mixer 11 updates the contents of the current memory 251, and transmits the updated contents of the current memory 251 to the management apparatus 12. The CPU 303 receives the updated contents of the current memory 251 via the network I/F 305, and synchronizes contents of the current memory 351 with the updated contents of the current memory 251. Further, when the user operates the user I/F 202 to register new scene data, edit contents of the scene data, or delete the scene data, the mixer 11 updates contents of the scene memory 252. The mixer 11 transmits the updated contents of the scene memory 252 to the management apparatus 12. The CPU 303 receives the updated contents of the scene memory 252 via the network I/F 305, and synchronizes contents of the scene memory 352 with the updated contents of the scene memory 252.

The preview memory 353 is a memory for transferring specific scene data from the scene memory 352 and previewing contents of the specific scene data. The user designates specific scene data and requests a preview via the GUI of the GUI program 354. The designated scene data is transferred to the preview memory 353 without being recalled to the current memory 351. The user can refer to the scene data loaded in the preview memory 353 via the GUI program 354 and refer to the acoustic parameters.

The CPU 303 receives input of the acoustic parameters from the user via the GUI program 354, and receives editing of the current memory 351, the scene memory 352, and the preview memory 353. The user can also store the edited contents of the preview memory 353 in the scene memory 352. The user may overwrite scene data designated by the contents of the preview memory 353, or may store the edited contents as new scene data.

The CPU 303 transmits the edited contents of the current memory 351 and the scene memory 352 to the mixer 11. The mixer 11 synchronizes the contents of the current memory 251 and the scene memory 252 with the updated contents of the current memory 351 and the scene memory 352.

The flash memory 207 of the mixer 11 may include a preview memory. In this case, the user operates the user I/F 202 of the mixer 11 to designate scene data, and loads the designated scene data in the preview memory of the mixer 11. A user of the mixer 11 can refer to contents of the preview memory via the display 201 of the mixer 11. The mixer 11 may reflect the contents of the preview memory in the digital signal processor 204, perform a signal processing in accordance with the contents of the preview memory instead of the current memory 251, and send the sound signal after the signal processing to a monitor bus. In this case, the user can also hear a sound when the contents of the preview memory are loaded in the current memory 251.

When the user edits the preview memory of the mixer 11 and stores the edited preview memory in the scene memory 252, the mixer 11 updates the contents of the scene memory 252. In this case, the mixer 11 transmits the updated contents of the scene memory 252 to the management apparatus 12. The CPU 303 receives the updated contents of the scene memory 252 via the network I/F 305, and synchronizes the contents of the scene memory 352 with the updated contents of the scene memory 252.

As described above, the user can control the acoustic device (signal processing engine) such as the mixer 11 by using the management apparatus 12.

Figure 5:
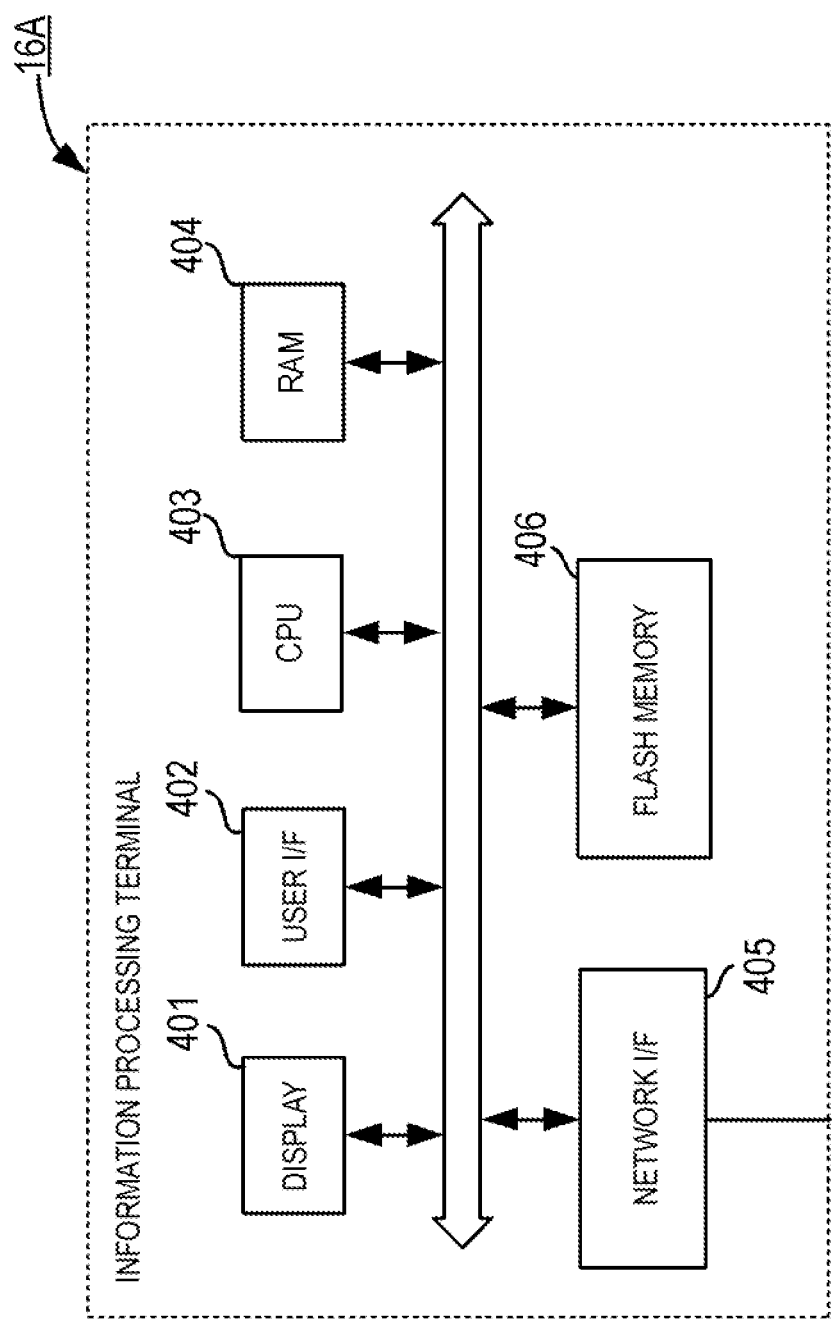
FIG. 5 is a block diagram showing a configuration of an information processing terminal 16.

Next, FIG. 5 is a block diagram showing a configuration of the information processing terminal 16A. The information processing terminals 16A to 16C have the same configuration and function. Therefore, FIG. 5 shows the configuration of the information processing terminal 16A as a representative. The information processing terminal 16A is, for example, a general-purpose information processing apparatus such as a personal computer a smartphone, or a tablet computer.

The information processing terminal 16A includes a display 401, a user I/F 402, a CPU 403, a RAM 404, a network I/F 405, and a flash memory 406.

The CPU 403 reads a program stored in the flash memory 406, which is a storage medium, into the RAM 404 to implement a predetermined function. The program read by the CPU 403 also does not need to be stored in the flash memory 406 in the own apparatus. For example, the program may be stored in a storage medium of an external apparatus such as a server. In this case, the CPU 403 may read the program from the server into the RAM 404 and execute the program each time.

In a state where the information processing terminal 16A is connected to the management apparatus 12 via the network I/F 405, the user can receive the GUI from the GUI program 354 via the application program of the web browser.

In this case, a user of the information processing terminal 16A can edit the current memory 351 and the scene memory 352 via the GUI program 354. Further, the user of the information processing terminal 16A can designate specific scene data from the scene memory. 352 via the GUI program 354 and request a preview. The user of the information processing terminal 16A can refer to acoustic parameters of the scene data loaded in the preview memory 353 via the GUI program 354. Further, the user can input the acoustic parameters via the GUI program 354 and edit the preview memory 353. The user can also store the edited contents of the preview memory 353 in the scene memory 352.

In this way, when the GUI program 354 is the web application program, the information processing terminal 16 can edit the current memory 351, the scene memory 352, and the preview memory 353 of the management apparatus 12 via a general-purpose application program of a web browser without using a dedicated operating system and an application program.

Figure 6:
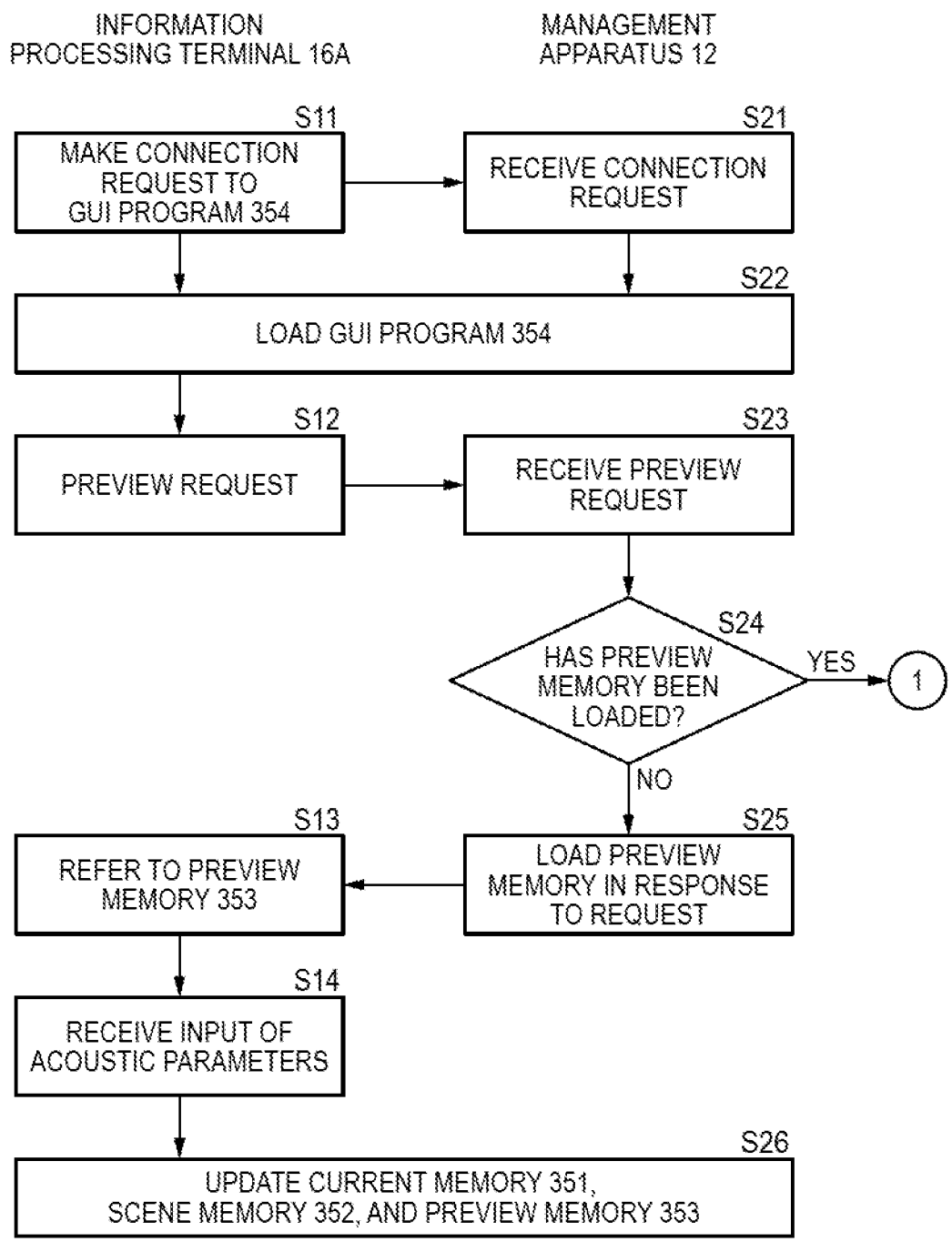
FIG. 6 is a flowchart showing operations of the information processing terminal 16A and the management apparatus 12.
Figure 7:
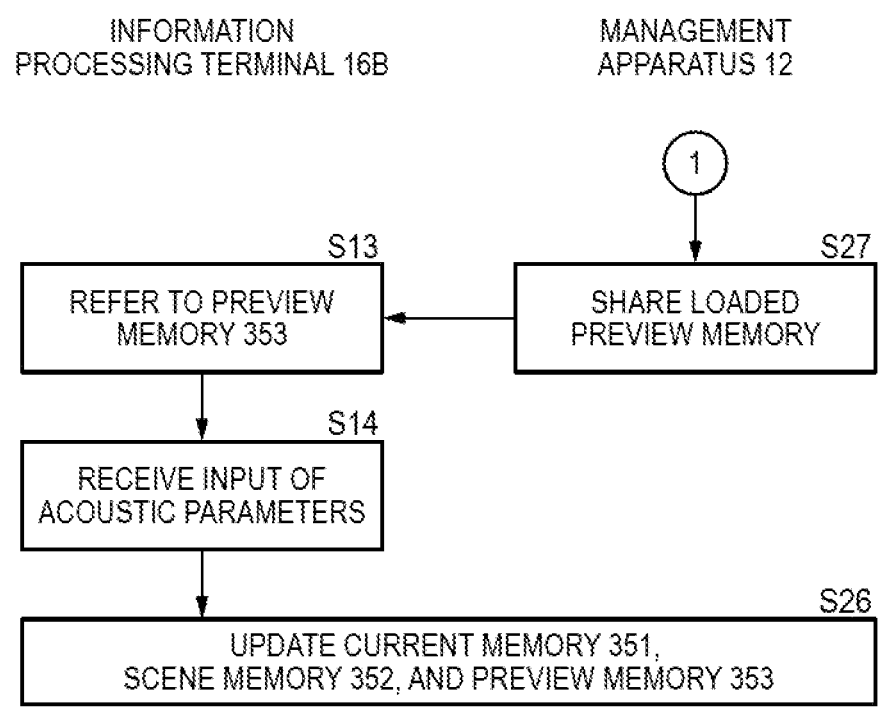
FIG. 7 is a flowchart showing operations of the information processing terminal 16B and the management apparatus 12.

FIG. 6 is a flowchart showing operations of the information processing terminal 16A and the management apparatus 12. FIG. 7 is a flowchart showing operations of the information processing terminal 16B and the management apparatus 12. FIGS. 6 and 7 show an example in which, first, the information processing terminal 16A, which is a first terminal, is connected to the management apparatus 12 and refers to the preview memory 353, and then the information processing terminal 16B, which is a second terminal, is connected to the management apparatus 12 and refers to the preview memory 353.

As shown in FIG. 6, when the information processing terminal 16A is connected to the management apparatus 12, the information processing terminal 16A makes a request to the management apparatus 12 to connect to the GUI program 354 (S11). The management apparatus 12 receives the connection request (S21) and loads the GUI program 354 in the information processing terminal 16A (S22). As described above, when the GUI program 354 is the web application program, the information processing terminal 16A can load the GUI program 354 in the own apparatus by accessing the GUI program 354 via the web browser.

The information processing terminal 16A receives a preview request from the user via the user I/F 402 (S12). The preview request includes information for specifying target scene data.

When receiving the preview request from the information processing terminal 16A (S23), the management apparatus 12 determines whether the preview memory has been loaded (S24). When determining that the preview memory has been loaded, the management apparatus 12 proceeds to an operation of FIG. 7 (S24→Yes). When newly loading the preview memory (S24→No), the management apparatus 12 loads scene data corresponding to a request from the information processing terminal 16A in the preview memory 353 (S25). The information processing terminal 16A refers to the preview memory 353 by the GUI program 354 (S13). Accordingly, the user of the information processing terminal 16A can preview designated scene data.

The information processing terminal 16A receives input of the acoustic parameters from the user via the GUI program 354 (S14). The user edits contents of the current memory 351, the scene memory 352, or the preview memory 353.

When receiving the input of the acoustic parameters, the information processing terminal 16A updates values of the current memory 351, the scene memory 352, and the preview memory 353 (S26).

On the other hand, when the information processing terminal 16B is connected to the management apparatus 12 after the information processing terminal 16A and makes a preview request, the management apparatus 12 determines in S24 that the preview memory has been loaded, and proceeds to the operation of FIG. 7 (S24→Yes).

As shown in FIG. 7, the management apparatus 12 causes the information processing terminal 16A to share the loaded preview memory 353 with the information processing terminal 16B (S27). Similar to the information processing terminal 16A, the information processing terminal 16B refers to the preview memory 353 by the GUI program 354 (S13). Accordingly, the user of the information processing terminal 16B shares the preview memory 353 referenced by the information processing terminal 16A. Further, similar to the information processing terminal 16A, the information processing terminal 16B receives input of the acoustic parameters from the user via the GUI program 354 (S14). When receiving the input of the acoustic parameters, the information processing terminal 16B updates the values of the current memory 351, the scene memory 352, and the preview memory 353 (S26).

Accordingly, the user of the information processing terminal 16B can also edit the contents of the current memory 351, the scene memory 352, or the preview memory 353. That is, the user of the information processing terminal 16A and the user of the information processing terminal 16B refer to and edit the same preview memory.

In this way, the acoustic parameter editing system of the present embodiment can preview the acoustic parameters by a plurality of users who do not directly operate an acoustic apparatus such as the mixer.

Figure 8:
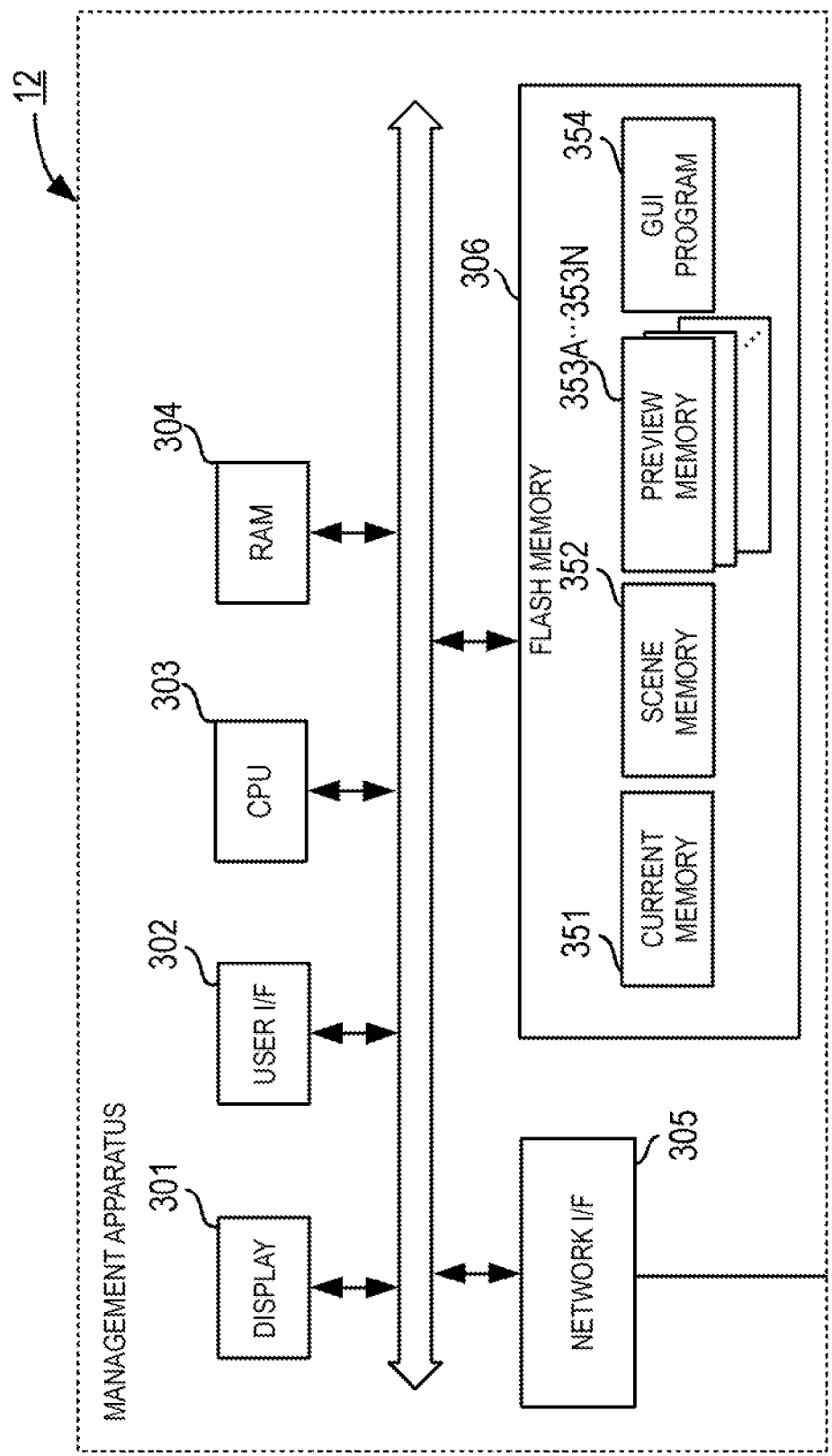
FIG. 8 is a block diagram showing a configuration of the management apparatus 12 when a plurality of preview memories are provided.

Next, FIG. 8 is a block diagram showing a configuration of the management apparatus 12 when a plurality of preview memories are provided. The configuration of the management apparatus 12 shown in FIG. 8 is the same as the configuration shown in FIG. 4 except that a plurality of preview memories 353A to 353N are provided.

Figure 9:
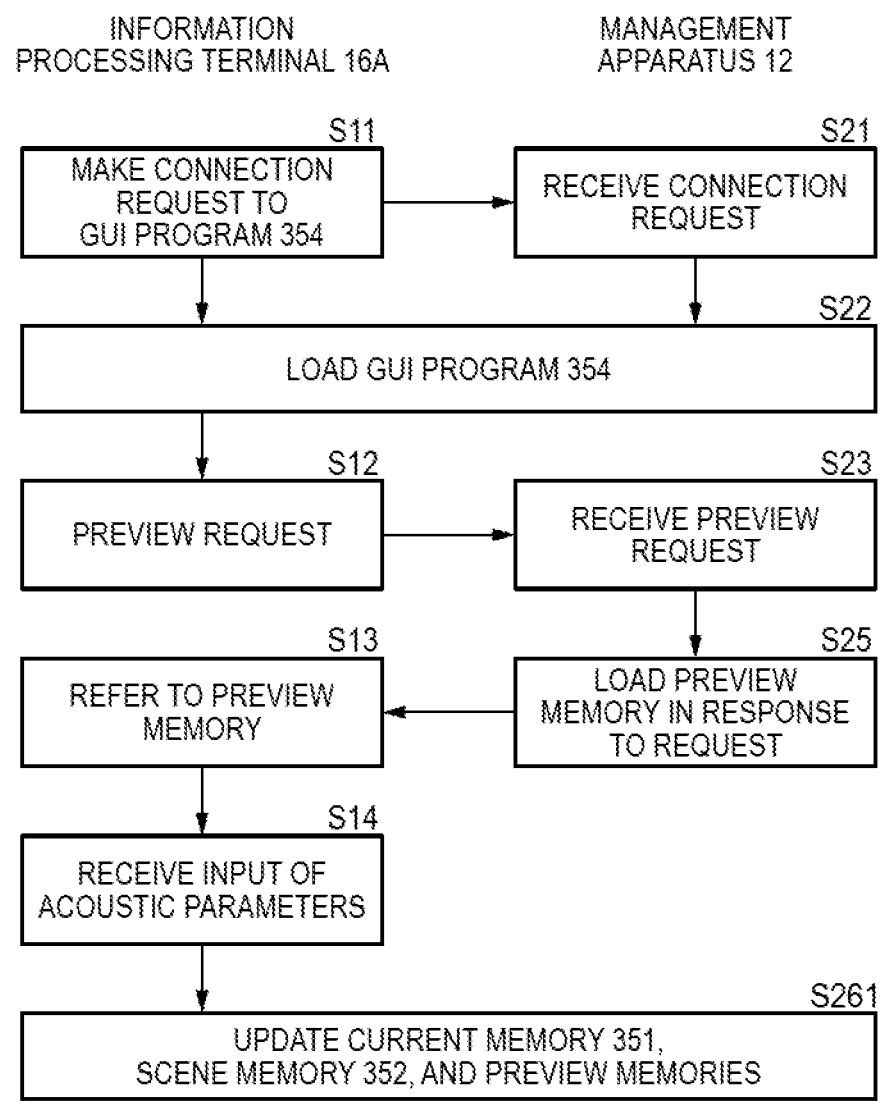
FIG. 9 is a flowchart showing operations of the management apparatus 12 and the information processing terminal 16A when a preview memory 353 corresponding to requests is loaded for all information processing terminals.

FIG. 9 is a flowchart showing operations of the management apparatus 12 and the information processing terminal 16A when the preview memory 353 corresponding to requests is loaded for all information processing terminals. FIG. 9 shows an operation of the information processing terminal 16A that is the first terminal as a representative, but the same operation is performed by other information processing terminals. Further, the same operations as those of FIG. 6 are denoted by the same reference numerals.

After receiving a preview request, the management apparatus 12 in this example loads scene data corresponding to a request from the information processing terminal 16A in the preview memory 353A without determining whether the preview memory has been loaded. Similarly, when the information processing terminal 16B, which is the second terminal, makes a request thereafter, the management apparatus 12 loads scene data corresponding to the request from the information processing terminal 16B in the preview memory 353B. Similarly, when the information processing terminal 16C, which is a third terminal, makes a request thereafter, the management apparatus 12 loads scene data corresponding to the request from the information processing terminal 16C in the preview memory 353C. That is, the management apparatus 12 loads the preview memories corresponding to the requests for all the information processing terminals. Therefore, each information processing terminal refers to a different preview memory. Thereafter, when receiving input of the acoustic parameters from the user via the GUI program 354 (S14), each information processing terminal updates values of the current memory 351, the scene memory 352, and the preview memory to which each information processing terminal refers (S261).

Accordingly, the users of the information processing terminals 16A to 16C can refer to and edit different preview memories.

Figure 10:
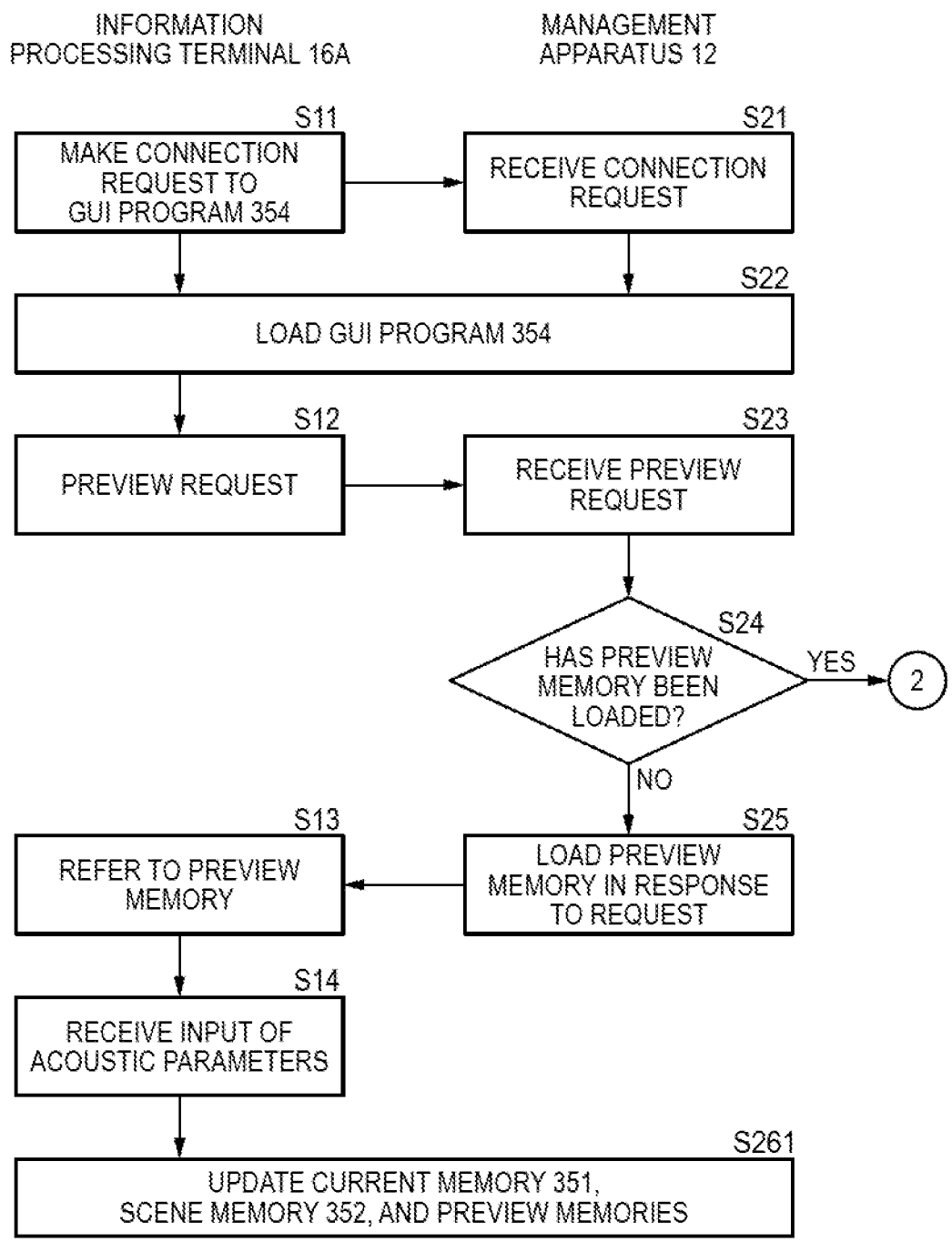
FIG. 10 is a flowchart showing operations of the information processing terminal 16A and the management apparatus 12 when selection of whether to load the preview memory 353 corresponding to a request or to share the preview memory 353 that has already been loaded is received.
Figure 11:
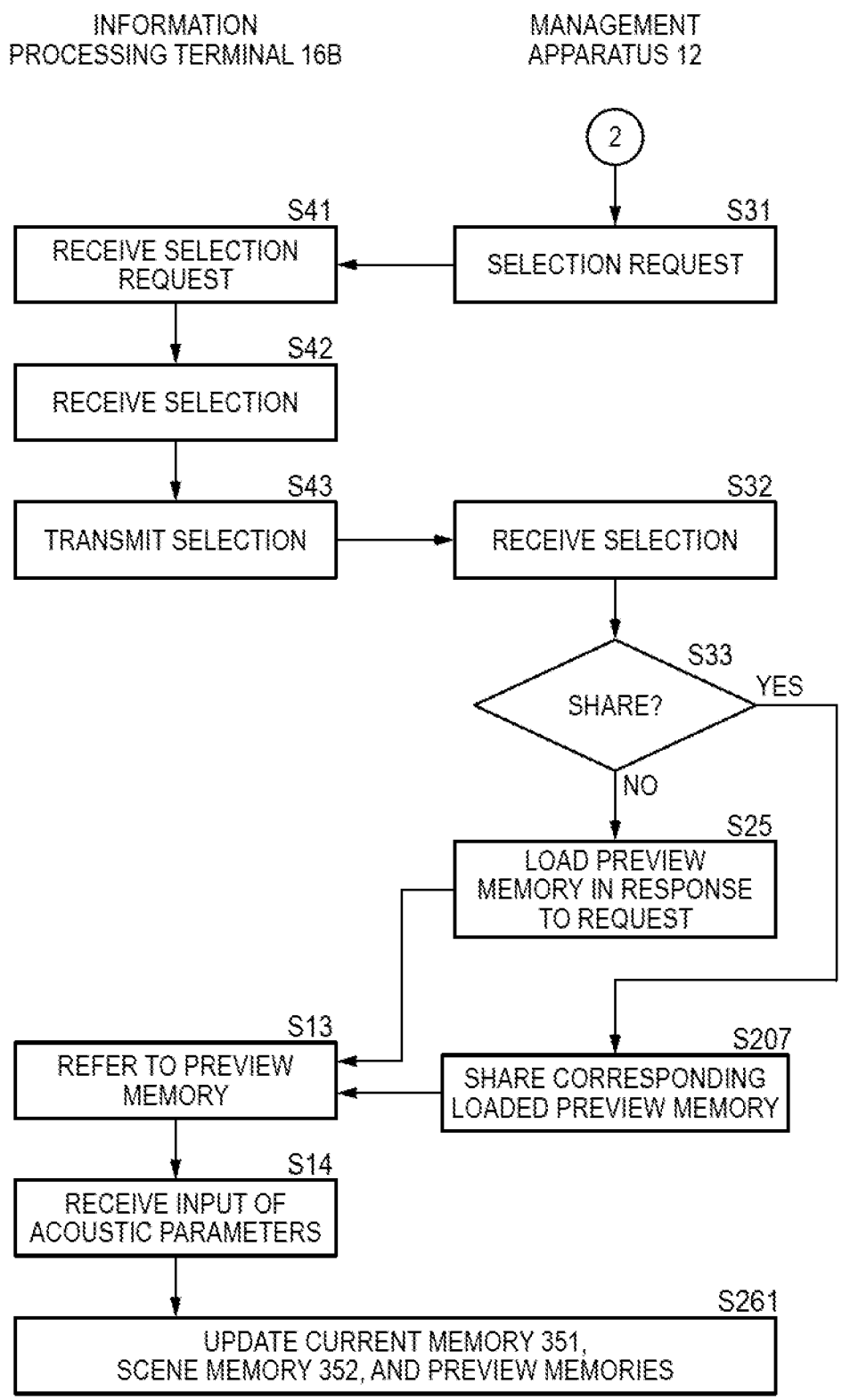
FIG. 11 is a flowchart showing operations of the information processing terminal 16B and the management apparatus 12.

On the other hand, FIG. 10 is a flowchart showing operations of the information processing terminal 16A and the management apparatus 12 when receiving a selection of whether to load a preview memory corresponding to a request or to share a preview memory that has already been loaded. FIG. 11 is a flowchart showing operations of the information processing terminal 16B and the management apparatus 12. FIGS. 10 and 11 show an example in which, first, the information processing terminal 16A, which is the first terminal, is connected to the management apparatus 12 and refers to the preview memory 353A, and then the information processing terminal 16B, which is the second terminal, is connected to the management apparatus 12 and refers to the preview memory.

Since the operations of the information processing terminal 16A and the management apparatus 12 in FIG. 10 are the same as those of FIG. 6 except for S261, description thereof will be omitted. However, in the example of FIG. 10, when the information processing terminal 16B is connected to the management apparatus 12 and makes a preview request after the information processing terminal 16A, the management apparatus 12 determines in S24 that the preview memory has been loaded, and proceeds to an operation of FIG. 11 (S24→Yes).

As shown in FIG. 11, the management apparatus 12 requests the information processing terminal 16B to select whether to load a new preview memory 353B or to share the preview memory 353A that has already been loaded for the information processing terminal 16A (S31). The information processing terminal 16B receives the selection request (S41) and receives a selection from the user (S42). The information processing terminal 16B transmits the received selection to the management apparatus 12 (S43). In this example, the loaded preview memory is only one preview memory 353A loaded for the information processing terminal 16A, but when the plurality of preview memories have been loaded, a selection of which preview memory to share is also received.

The management apparatus 12 receives the selection of the user via the information processing terminal 16B (S32), and determines whether a selection of loading the new preview memory 353B is received, or a selection of sharing the preview memory 353A that has already been loaded for the information processing terminal 16A is received (S33).

When receiving the selection of loading the new preview memory 353B (S33→No), the management apparatus 12 loads scene data corresponding to a request from the information processing terminal 16B in the preview memory 353B (S25).

On the other hand, when receiving the selection of sharing the loaded preview memory 353A (S33→Yes), the management apparatus 12 causes the information processing terminal 16B to share the corresponding preview memory 353A (S207).

The information processing terminal 16B refers to the preview memory by the GUI program 354 (S13). Accordingly, the user of the information processing terminal 16B refers to the new preview memory 353B or shares the preview memory 353A referenced by the information processing terminal 16A. Further, similar to the information processing terminal 16A, the information processing terminal 16B receives input of the acoustic parameters from the user via the GUI program 354 (S14). When receiving the input of the acoustic parameters, each information processing terminal 16 updates the values of the current memory 351, the scene memory 352, and the preview memory to which each information processing terminal 16 refers (S264).

Accordingly, the users of the information processing terminals 16A to 16C can also refer to and edit the same preview memories as those of other information processing terminals, or can also refer to and edit preview memories dedicated to the users.

The description of the present embodiment is to exemplify the present invention in every point and is not intended to restrict the present invention. The scope of the present invention is indicated not by the above embodiment but by the scope of the claims. The scope of the present invention is intended to include meanings equivalent to the claims and all modifications within the scope.

For example, the sound signal processing engine is not limited to the mixer 11. For example, the management apparatus 12 may include a DSP (sound signal processing engine) in the own apparatus. In this case, the management apparatus 12 may perform a signal processing in accordance with the contents of the preview memory 353 and provide a sound signal after the signal processing to the user of the management apparatus 12. In this case, the user can also hear a sound when contents of the preview memory are loaded in the current memory 351. The sound signal processing may be performed by a CPU, an FPGA, or the like. That is, the sound signal processing engine may have an configuration such as a CPU, a DSP, or an FPGA. Further, an apparatus (for example, a server) different from the management apparatus 12 may function as the sound signal processing engine that performs the sound signal processing.

The information processing terminals 164 to 16C each may include a current memory, a scene memory, and a preview memory in the own apparatus. When editing the current memory 351, the scene memory 352, and the preview memory 353 of the management apparatus 12 in a connected state with the management apparatus 12, the information processing terminals 16A to 16C transfer the contents of the current memory 351, the scene memory 352, and the preview memory 353 to the current memories, the scene memories, and the preview memories of the own apparatuses and synchronize them. Then, the information processing terminals 16A to 16C receive editing of the current memories, the scene memories, and the preview memories of the own apparatuses in a disconnected state with the management apparatus 12. When the information processing terminals 16A to 16C are connected to the management apparatus 12 next, the information processing terminals 16A to 16C may receive selection of whether to transfer the current memories, the scene memories, and the preview memories of the own apparatuses to the current memory 351, the scene memory 352, and the preview memory 353 of the management apparatus 12, or to transfer the current memory 351, the scene memory 352, and the preview memory 353 of the management apparatus 12 to the current memories, the scene memories, and the preview memories of the own apparatuses. Accordingly, the user can edit the acoustic parameters even in a place other than a venue where the acoustic device is installed (for example, a concert hall), and can also directly edit acoustic parameters of the acoustic device even in the venue. Further, when the user edits the acoustic parameters in a place other than the venue and then returns to the venue where the acoustic device is installed, the user can also reflect the acoustic parameters edited by the information processing terminals 16A to 16C in the acoustic device in the venue or can also maintain the acoustic parameters already set in the acoustic device in the venue.

What is claimed is:

1. An acoustic parameter editing method for a plurality of terminals and a management apparatus, wherein the plurality of terminals is configured to receive editing of an acoustic parameter, and the management apparatus is individually connected to the plurality of terminals and includes a preview memory configured to preview the acoustic parameter before reflecting the acoustic parameter in a sound signal processing engine, the acoustic parameter editing method comprising:

connecting a first terminal among the plurality of terminals to the management apparatus to make a request for the preview from the first terminal to the management apparatus;

in response to the request from the first terminal, causing, by the management apparatus, the first terminal to refer to the preview memory of the management apparatus;

subsequently connecting a second terminal among the plurality of terminals to the management apparatus to make a request for the preview from the second terminal to the management apparatus; and subsequently causing, by the management apparatus, the second terminal to share the preview memory referenced by the first terminal, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

2. The acoustic parameter editing method according to claim 1, wherein the management apparatus receives a request for a preview from the scene memory, and transfers content of the scene memory to the preview memory.

3. An acoustic parameter editing method for a plurality of terminals and a management apparatus, wherein the plurality of terminals is configured to receive editing of an acoustic parameter, and the management apparatus is individually connected to the plurality of terminals and includes a plurality of preview memories configured to preview the acoustic parameter before reflecting the acoustic parameter in a sound signal processing engine, the acoustic parameter editing method comprising:

connecting a first terminal among the plurality of terminals to the management apparatus to make a request for the preview from the first terminal to the management apparatus;

in response to the request from the first terminal, causing, by the management apparatus, the first terminal to refer to a first preview memory among the plurality of preview memories in the management apparatus;

connecting a second terminal among the plurality of terminals to the management apparatus to make a request for the preview from the second terminal to the management apparatus; and subsequently in response to the request from the second terminal, causing, by the management apparatus, the second terminal to refer to a second preview memory among the plurality of preview memories in the management apparatus, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

4. An acoustic parameter editing method for a plurality of terminals and a management apparatus, wherein the plurality of terminals is configured to receive editing of an acoustic parameter, and the management apparatus is individually connected to the plurality of terminals and includes a plurality of preview memories configured to preview the acoustic parameter before reflecting the acoustic parameter in a sound signal processing engine, the acoustic parameter editing method comprising:

connecting a first terminal among the plurality of terminals to the management apparatus to make a request for the preview from the first terminal to the management apparatus;

in response to the request from the first terminal, causing, by the management apparatus, the first terminal to refer to a first preview memory among the plurality of preview memories in the management apparatus;

connecting a second terminal among the plurality of terminals to the management apparatus to make a request for the preview from the second terminal to the management apparatus;

receiving, by the management apparatus, selection of whether to cause the second terminal to share the first preview memory referenced by the first terminal or to cause the second terminal to refer to a second preview memory among the plurality of preview memories in response to the request from the second terminal; and causing, by the management apparatus, the second terminal to refer to the selected first preview memory or the selected second preview memory, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

5. An acoustic parameter editing system comprising:

a plurality of terminals that is configured to receive editing of an acoustic parameter; and a management apparatus that is individually connected to the plurality of terminals and that includes a preview memory for previewing the acoustic parameter before reflecting the acoustic parameter in a sound signal processing engine, wherein when a first terminal among the plurality of terminals is connected to the management apparatus and a request for a preview is made by the first terminal, the management apparatus causes the first terminal to refer to the preview memory in response to the request from the first terminal, wherein when a second terminal among the plurality of terminals is connected to the management apparatus and a request for the preview is subsequently made by the second terminal, the management apparatus causes the second terminal to share the preview memory referenced by the first terminal, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

6. The acoustic parameter editing system according to claim 5, wherein the management apparatus receives a request for a preview from the scene memory, and transfers received content of the scene memory to the preview memory.

7. An acoustic parameter editing system comprising:

a plurality of terminals that is configured to receive editing of an acoustic parameter; and a management apparatus that is individually connected to the plurality of terminals and that includes a plurality of preview memories for previewing the acoustic parameter before reflecting the acoustic parameter in a sound signal processing engine, wherein when a first terminal among the plurality of terminals is connected to the management apparatus and a request for a preview is made by the first terminal, the management apparatus causes the first terminal to refer to a first preview memory among the plurality of preview memories in response to the request from the first terminal, wherein when a second terminal among the plurality of terminals is connected to the management apparatus and a request for the preview is made by the second terminal, the management apparatus causes the second terminal to refer to a second preview memory among the plurality of preview memories in response to the request from the second terminal, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

8. An acoustic parameter editing system comprising:

a plurality of terminals that is configured to receive editing of an acoustic parameter, and a management apparatus that is individually connected to the plurality of terminals and that comprises a plurality of preview memories for previewing the acoustic parameter before reflecting the acoustic parameter in a sound signal processing engine, wherein when a first terminal among the plurality of terminals is connected to the management apparatus and a request for a preview is made by the first terminal, the management apparatus causes the first terminal to refer to a first preview memory among the plurality of preview memories in response to the request from the first terminal, and wherein when a second terminal among the plurality of terminals is connected to the management apparatus and a request for the preview is made by the second terminal, the management apparatus receives selection of whether to cause the second terminal to share the first preview memory referenced by the first terminal or to cause the second terminal to refer to a second preview memory among the plurality of preview memories in response to the request from the second terminal, the management apparatus causes the second terminal to refer to the selected first preview memory or the selected second preview memory, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

9. A management apparatus that is individually connected to a plurality of terminals for receiving editing of an acoustic parameter, the management apparatus comprising:

a processor; and a preview memory that is configured to preview the acoustic parameter before reflecting the acoustic parameter in a sound signal processing engine, wherein when a first terminal among the plurality of terminals is connected to the management apparatus and a request for the preview is received from the first terminal, the processor of the management apparatus causes the first terminal to refer to the preview memory in response to the request from the first terminal, wherein when a second terminal among the plurality of terminals is subsequently connected to the management apparatus and a request for the preview is received from the second terminal, the processor of the management apparatus causes the second terminal to share the preview memory referenced by the first terminal, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

10. A management apparatus that is individually connected to a plurality of terminals for receiving editing of an acoustic parameter, the management apparatus comprising:

a processor; and a plurality of preview memories that are configured to preview the acoustic parameter before reflecting the acoustic parameter in a sound signal processing engine, wherein when a first terminal among the plurality of terminals is connected to the management apparatus and a request for the preview is received from the first terminal, the processor of the management apparatus causes the first terminal to refer to a first preview memory among the plurality of preview memories in response to the request from the first terminal, wherein when a second terminal among the plurality of terminals is connected to the management apparatus and a request for the preview is received from the second terminal, the processor of the management apparatus causes the second terminal to refer to a second preview memory among the plurality of preview memories in response to the request from the second terminal, wherein the management apparatus includes a scene memory in which an acoustic parameter to be reflected in the sound signal processing engine is stored as scene data, and a current memory that indicates the acoustic parameter currently reflected in the sound signal processing engine, and wherein the acoustic parameter editing method further comprises editing of the scene memory, editing of the preview memory, and editing of the current memory.

11. A management apparatus that is individually connected to a plurality of terminals for receiving editing of an acoustic parameter, the management apparatus comprising:
a processor; and
a plurality of preview memories that are configured to preview the acoustic parameter before reflecting the acoustic parameter in a sound signal processing engine,
wherein when a first terminal among the plurality of terminals is connected to the management apparatus and a request for the preview is received from the first terminal, the processor of the management apparatus causes the first terminal to refer to a first preview memory among the plurality of preview memories in response to the request from the first terminal, and
wherein when a second terminal among the plurality of terminals is connected to the management apparatus and a request for the preview is received from the second terminal, the processor of the management apparatus receives selection of whether to cause the second terminal to share the first preview memory referenced by the first terminal or to cause the second terminal to refer to a second preview memory among the plurality of preview memories in response to the request from the second terminal,
the management apparatus causes the second terminal to refer to the selected first preview memory or the selected second preview memory,
wherein the management apparatus includes a scene memory in which an acoustic parameter to be reflected in the sound signal processing engine is stored as scene data, and a current memory that indicates the acoustic parameter currently reflected in the sound signal processing engine, and
wherein the acoustic parameter editing method further comprises editing of the scene memory, editing of the preview memory, and editing of the current memory.

12. A terminal that is connected to a management apparatus including a preview memory for previewing an acoustic parameter before reflecting the acoustic parameter in a sound signal processing engine, the terminal configured to receive editing of the acoustic parameter, the terminal comprising:
a memory storing instructions; and
a processor that implements the instructions,
wherein the management apparatus includes a scene memory in which an acoustic parameter to be reflected in the sound signal processing engine is stored as scene data, and a current memory that indicates the acoustic parameter currently reflected in the sound signal processing engine,
wherein the acoustic parameter editing method further comprises editing of the scene memory, editing of the preview memory, and editing of the current memory,
wherein when the terminal is connected to the management apparatus and makes a request for a preview, the processor of the terminal refers to the preview memory, and
wherein when the terminal is connected to the management apparatus in a state in which another terminal refers to the preview memory and makes a request for the preview, the processor of the terminal shares the preview memory referenced by the other terminal.

13. The terminal according to claim 12,
wherein when the terminal is connected to the management apparatus and makes a request for an edit of the scene memory, the processor of the terminal refers to the scene memory, and
wherein when the terminal is connected to the management apparatus in a state in which another terminal refers to the scene memory and makes a request for the edit of the scene memory, the processor of the terminal shares the scene memory referenced by the other terminal.

14. A terminal that is connected to a management apparatus including a plurality of preview memories for previewing an acoustic parameter before reflecting the acoustic parameter in a sound signal processing engine, the terminal comprising:
a memory storing instructions; and
a processor that implements the instructions,
wherein the management apparatus includes a scene memory in which an acoustic parameter to be reflected in the sound signal processing engine is stored as scene data, and a current memory that indicates the acoustic parameter currently reflected in the sound signal processing engine,
wherein the acoustic parameter editing method further comprises editing of the scene memory, editing of the preview memory, and editing of the current memory,
wherein the terminal is configured to receive editing of the acoustic parameter,
wherein when the terminal is connected to the management apparatus and makes a request for a preview, the processor of the terminal refers to a first preview memory among the plurality of preview memories, and
wherein when another terminal is connected to the management apparatus and makes a request for the preview, the processor of the other terminal refers to a second preview memory among the plurality of preview memories.

15. A terminal that is connected to a management apparatus including a plurality of preview memories for previewing an acoustic parameter before reflecting the acoustic parameter in a sound signal processing engine, the terminal comprising:
a memory storing instructions; and
a processor that implements the instructions,
wherein the management apparatus includes a scene memory in which an acoustic parameter to be reflected in the sound signal processing engine is stored as scene data, and a current memory that indicates the acoustic parameter currently reflected in the sound signal processing engine,
wherein the acoustic parameter editing method further comprises editing of the scene memory, editing of the preview memory, and editing of the current memory,
wherein the terminal is configured to receive editing of the acoustic parameter,
wherein when the terminal is connected to the management apparatus and makes a request for a preview, the processor of the terminal refers to a first preview memory among the plurality of preview memories,
wherein when the terminal is connected to the management apparatus in a state in which another terminal refers to any one of the plurality of preview memories and makes a request for the preview, the processor of the terminal receives a selection of whether to share the preview memory referenced by the other terminal or to refer to a second preview memory among the plurality of preview memories, and wherein based on the received selection, the processor of the terminal shares the preview memory referenced by the other terminal or refers to the second preview memory.

* * * * *